United States Patent
van Loon et al.

(10) Patent No.: US 11,520,708 B2
(45) Date of Patent: Dec. 6, 2022

(54) MEMORY SYSTEM WITH AN INCREMENTAL HASHING OPERATION AND METHOD

(71) Applicant: NXP B.V., Eindhoven (NL)

(72) Inventors: Marcel Rene van Loon, Oss (NL); Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 359 days.

(21) Appl. No.: 16/707,515

(22) Filed: Dec. 9, 2019

(65) Prior Publication Data

US 2020/0192822 A1 Jun. 18, 2020

(30) Foreign Application Priority Data

Dec. 14, 2018 (EP) .................................... 18212809

(51) Int. Cl.
*G06F 12/14* (2006.01)
*G06F 9/30* (2018.01)
*G06F 12/02* (2006.01)
*G06F 12/1018* (2016.01)
*H04L 9/06* (2006.01)

(52) U.S. Cl.
CPC ...... *G06F 12/1408* (2013.01); *G06F 9/30029* (2013.01); *G06F 12/0292* (2013.01); *G06F 12/1018* (2013.01); *H04L 9/0637* (2013.01); *H04L 9/0643* (2013.01)

(58) Field of Classification Search
CPC .. G06F 12/1009; G06F 12/1018; G06F 21/64; G06F 12/0292; G06F 12/1408; G06F 9/30029; G06F 2212/7209; H04L 9/3236; H04L 9/0643; H04L 9/0637
See application file for complete search history.

(56) References Cited

U.S. PATENT DOCUMENTS

| | | | |
|---|---|---|---|
| 5,694,569 A | 12/1997 | Fischer | |
| 8,108,641 B2 | 1/2012 | Goss et al. | |
| 8,341,422 B2 | 12/2012 | Kiehtreiber et al. | |
| 2006/0288223 A1* | 12/2006 | Kiehtreiber | G06F 21/50 713/176 |
| 2007/0294496 A1* | 12/2007 | Goss | H04W 12/102 711/163 |

(Continued)

OTHER PUBLICATIONS

Gueron, Shay, "A Memory Encryption Engine Suitable for General Purpose Processors", Intel, Feb. 2016, pp. 1-14.

(Continued)

*Primary Examiner* — Shanto Abedin (57) ABSTRACT

A memory system, comprising: i) a first electronic device comprising a processor, ii) a second electronic device being external to the first electronic device and comprising a memory, wherein the memory stores a memory image over at least a part of a data set stored on the memory, and iii) a hash value related to the memory image. The first electronic device and the second electronic device are coupled such that the processor has at least partial control over the second electronic device. The processor is configured to, when updating the data set stored on the memory of the second electronic device, also update the hash value related to the memory image using an incremental hashing operation so that only those parts of the memory image are processed that have changed.

13 Claims, 4 Drawing Sheets

(56) References Cited

U.S. PATENT DOCUMENTS

| | | | | |
|---|---|---|---|---|
| 2011/0078420 | A1* | 3/2011 | Trescher | G06F 21/52 |
| | | | | 712/E9.016 |
| 2011/0103578 | A1 | 5/2011 | Orlando et al. | |
| 2012/0011351 | A1* | 1/2012 | Mundra | H04L 9/0869 |
| | | | | 713/192 |
| 2013/0019105 | A1* | 1/2013 | Hussain | G06F 21/31 |
| | | | | 713/189 |
| 2015/0173294 | A1 | 6/2015 | Becker et al. | |
| 2015/0355900 | A1* | 12/2015 | Crosby | G06F 8/654 |
| | | | | 717/168 |
| 2016/0140357 | A1* | 5/2016 | Newell | G06F 3/0679 |
| | | | | 726/2 |
| 2016/0147457 | A1* | 5/2016 | Legler | G06F 3/0605 |
| | | | | 707/601 |
| 2017/0185533 | A1* | 6/2017 | Rozas | H04L 9/32 |
| 2018/0006820 | A1* | 1/2018 | Arasu | G06F 21/645 |
| 2019/0340365 | A1* | 11/2019 | Nijhawan | G06F 21/44 |

OTHER PUBLICATIONS

Gassend, B. et al., "Caches and Hash Trees for Efficient Memory Integrity Verification", IEEE High Performance Computer architecture, 2003, HPCA-9 2003 proceedings, pp. 1-12.

Elbaz et al.: "A Parallelized Way to Provide Data Encryption and Integrity Checking on a Processor-Memory Bus", DAC 2006, Jul. 24-28, 2006, San Francisco, California, USA, pp. 506-509.

Suh, Edward et al., "AEGIS: Architecture for Tamper-Evident and Tamper-Resistant Processing", ICS'03, Jun. 23-26, 2003, San Francisco, CA, USA, pp. 160-171.

Clarke, Dwaine et al., "Offline Integrity Checking of Untrusted Storage", Nov. 30, 2002, Retrieved from the Internet at http://citeseerx.ist.psu.edu/viewdoc/download?doi=10.1.1.13.5564&rep=repl&type=pdf on Feb. 18, 2019.

Duc, Guillaume et al., "CryptoPage: an Efficient Secure Architecture with Memory Encryption, Integrity and Information Leakage Protection", Proceedings of the 22nd Annual Computer Security Applications Conference (ACSAC'06), 2006, pp. 1-10.

Elbaz, Reouven et al., "Hardware Mechanisms for Memory Authentication: A Survey of Existing Techniques and Engines", M.L. Gavrilova et al. (Eds.): Trans. on Comput. Sci. IV, LNCS 5430, 2009., pp. 1-22.

Fischlin, Marc et al., "Incremental Cryptography and Memory Checkers", URL: http://www.uni-frankfurt.de/~roessner/group/marc/marc.html, pp. 1-16.

McGrew, David, "Efficient Authentication of Large, Dynamic Data Sets Using Galois/Counter Mode (GCM)", Third IEEE International Security in Storage Workshop, Dec. 13, 2005, IEEE, Piscataway, NJ, USA, pp. 1-6.

Blum, Manuel et al., "Checking the Correctness of Memories", Proceedings 32nd Annual Symposium of Foundations of Computer Science, IEEE, San Juan, Puerto Rico, USA, Oct. 1-4, 1991, pp. 1-21.

Hall, W. Eric et al.: "Parallelizable Authentication Trees", pp. 1-15.

Ostrovsky, Rafail, "Software Protection and Simulation on Oblivious RAMs", Computer Science, May 17, 1992, pp. 1-52.

Elbaz, Reouven et al., "TEC-Tree: A Low-Cost, Parallelizable Tree for Efficient Defense against Memory Replay Attacks", pp. 1-15.

Szefer, Jakub et al., "Towards Fast Hardware Memory Integrity Checking with Skewed Merkle Trees", HASP '14, Jun. 15, 2014, Minneapolis, MN, USA, pp. 1-8.

* cited by examiner

MEMORY SYSTEM WITH AN INCREMENTAL HASHING OPERATION AND METHOD

CROSS-REFERENCE TO RELATED APPLICATIONS

This application claims the priority under 35 U.S.C. § 119 of European Patent application no. 18212809.0, filed on 14 Dec. 2018, the contents of which are incorporated by reference herein.

FIELD OF THE INVENTION

The invention relates to a memory system and a method of operating the memory system.

BACKGROUND OF THE INVENTION

An on-chip (secure sub) system, e.g. when integrated on a System-on-Chip (SoC) in a small technology node, may not have access to a mechanism for sufficient on-chip ("secure") non-volatile storage of data and program code. Typically, only a very limited amount of one-time programmable (OTP) storage space is available. The use of this OTP hence needs to be carefully managed lest the device runs out of storage space during its lifetime, which would render it unusable.

This problem is generally overcome by allowing the secure sub-system to make use of an externally connected, non-secure, device for non-volatile storage of data. Hereby, a mechanism is needed to allow the secure on-chip subsystem to protect such externally stored data from eavesdropping, unauthorized modification, and unauthorized replacement. In particular, to protect against unauthorized modification and replacement, the secure on-chip subsystem may use a cryptographic hashing operation to calculate a signature over the externally stored data. This signature, being significantly smaller in size (than the content of the externally stored data), can then be stored in the available on-chip memory.

In order to also enable the on-chip secure subsystem to make updates to the externally stored data, the signature over the stored data also needs to be recalculated. However, this requires processing of all data covered by the signature by the secure on-chip subsystem. As this is a potentially large amount of data, this reprocessing may require an unacceptable amount of time.

Another challenge with the approach of using a single signature over the complete data set is the fact that the on-chip secure subsystem may not be capable of storing a single large data set in the on-chip memory. It may then need to be capable of accessing the data set in smaller parts. It is possible to break up the large amount of data, in smaller parts (e.g. pages) and calculate separate signatures over individual pages. This limits the amount of time needed to update the signature over an individual page, and allows the on-chip secure sub-system to verify the validity of data pages, one page at a time. This has, however, the disadvantage of having to store (in a non-volatile way) many signatures, one for each individual page that makes up the larger data set.

To overcome this, a mechanism called a "hash tree" may be used, basically calculating a single "root signature" reflecting the current value of all the "leaf hashes" in the tree. Using this mechanism, only the root hash of the tree needs to be stored in the on-chip non-volatile memory. Making updates to "leaf signatures", in a hash tree, presents a challenge: it may require processing of multiple nodes in the tree to update the root signature, making it a time-consuming process.

OBJECT AND SUMMARY OF THE INVENTION

It is an object of the invention to provide an update of an externally stored data set in an efficient, time-saving manner and secure manner.

In order to achieve the object defined above, a memory system, a method, and a computer program product according to the independent claims are provided.

According to an exemplary embodiment of the invention a memory system is provided. The memory system comprising: i) a first electronic device comprising a processor, ii) a second electronic device being external to the first electronic device and comprising a memory, wherein the memory stores a memory image over at least a part of a data set stored on the memory, and iii) a hash value (e.g. stored on a memory of the first electronic device) related to the memory image. The first electronic device and the second electronic device are coupled such that the processor has at least partial control over the second electronic device. The processor is configured to, when updating the data set (and the memory image) stored on the memory of the second electronic device, (also) update the hash value related to the memory image using an incremental hashing operation so that only those parts of the memory image are processed that have changed.

According to another exemplary embodiment of the invention, a method of operating a memory system is provided. The memory system has a first electronic device and a second electronic device being external to the first electronic device. The second electronic device comprises a memory, wherein the memory stores a memory image over at least a part of a data set stored on the memory. The memory system further comprises (e.g. in a memory of the first electronic device) a hash value related to the memory image. The method comprising: i) coupling the first electronic device and the second electronic device such that the first electronic device has at least partial control over the second electronic device, ii) updating the data set (and the memory image) stored on the memory of the second electronic device, and (thereafter or at the same time) iii) updating the hash value related to the memory image using an incremental hashing operation so that only those parts of the memory image are processed that have changed.

According to another exemplary embodiment of the invention, a computer program product is provided, which is configured to (for example, by comprising specific instructions), when being executed on a processor (or a computer), cause the processor (or computer) to perform the method as described above.

In the context of the present application, the term "electronic device" may refer to any device that comprises an electronic component. An electronic device is for example a memory, a processor, or a computing device that comprises a processor and a memory. Furthermore, an electronic device may be configured as an on-chip secure subsystem or as an external memory. A memory is for example a non-volatile memory, e.g. a Flash memory. The memory may store a plurality of data sets. Furthermore, the memory may comprise a memory image over at least a part of the stored data sets. A processor is for example a central processing unit, a microprocessor, or an integrated circuit. The processor of one electronic device may for example at least partially control another electronic device, in particular a memory, being external to the electronic device. Even though in the present context only one processor is mentioned, the person skilled in the art will understand that also a plurality of processors may be used, wherein e.g. each of which is performing another task.

In the context of the present application, the term "memory image" may refer to a data set or file that contains the contents and/or structure of a memory volume or of an entire memory device, e.g. a Flash memory. A memory image may be made by creating a sector-by-sector (part-by-part) copy of a source medium, thereby, in particular perfectly, replicating the structure and contents of a memory device independent of other file systems. Hereby, the memory image may be subdivided into parts, in particular into pages of a given size. Furthermore, a table may be created that gives an overview over information and/or versions of the parts or pages of the memory image. In this case, the term "related to the memory image" may also include the pages and the page (version) table.

In the context of the present application, the term "hashing" may refer to the operation of taking an input string of any length and giving out an output of a fixed length, wherein the output may be termed hash value. This hash value may be secured with a digital signature in a further step. In an example, a hash value may be calculated from a data set and then, the hash value is digitally signed in order to protect the data set. The term "cryptographic hashing" may refer to a specific form of hashing that is designed to be a one-way function, i.e. a function which is infeasible to invert. Due to the high level of security, the hash value provided by cryptographic hashing may be considered as a signature. An example for a cryptographic hash function may be SHA (secure hash algorithm). In the present context, the term "hash value" may refer to both, a hash value provided by a hashing operation and a hash value provided by a cryptographic hashing operation. In the present context, the term "hash value related to the memory image" may refer to a hash value that is in a certain relationship to the memory image. For example, the hash value may be a hash value over the memory image. In another example, the hash value may be a hash value over a table (e.g. a page version table) that contains information (e.g. version numbers) related to the memory image.

In the context of the present application, the term "incremental hashing operation" may refer to an operation that updates (processes) a hash value over a data set, a file, a table, or a memory image, such that only those parts are processed that actually changed. The incremental hashing operation may be implemented using a linear algorithm, for example a GHASH algorithm (see description below).

According to an exemplary embodiment, the invention may be based on the idea that an update of an externally stored data set may be performed in an efficient and time-saving, but still secure manner, when using an incremental hashing operation. A first electronic device, for example an on-chip secure subsystem, may require additional memory space and stores data sets in a memory of an external second electronic device, e.g. an external Flash memory. In order to protect the external data set from unauthorized modification, a hash value may be calculated (using e.g. a hashing operation and/or a cryptographic hashing operation) over a memory image of the external memory by a processor of the first electronic device and the hash value may be securely stored (e.g. on a secure memory of the first electronic device). Furthermore, the hash value may be a secure signature or may be digitally signed by the processor and the signature or a key for the signature may also be securely stored (e.g. on a secure memory of the first electronic device). When updating the external memory, also the hash value over the memory image (and/or pages of the memory image and/or a page table) may have to be updated. In this case, according to the prior art, the whole memory image has to be processed in order to provide the new hash value. It has now been surprisingly found that the update/processing of the memory image and its hash value can be done in an efficient and time-saving, but still secure manner, when the hashing operation is done using an incremental hashing operation. In this manner, only the parts of the memory image (and/or for example a page version table of the memory image) have to be processed which have actually changed.

In the following, further exemplary embodiments of the method and the communication system will be explained.

According to an exemplary embodiment, i) the memory of the second electronic device stores a table being indicative for information and/or versions of the parts of the memory image, ii) the hash value is calculated from the table, and iii) the processor is further configured to, when updating the data set and the memory image, update the hash value over the table using the incremental hashing operation so that only those parts of the table are processed that have changed. This may provide the advantage that the external memory can be efficiently organized and is protected by the first electronic device in a feasible manner, as small data sets can be used.

In the described embodiment, a table may store information such as a version number or a signature for each part of the memory image. The amount of data that have to be processed may hence be reduced, when the hash value is calculated from said table. This may be done alternatively or in combination with calculating the hash value from the whole memory image.

According to an exemplary embodiment, the memory image is divided into a plurality of pages and the table is a page version table that comprises the version number, in particular also the signature, of each page. This may provide the advantage that the external memory is efficiently organized using the established paging system.

The term "pages" may refer to an established memory organization (paging system), see for example the ISEF paging system. At first, a computer program or a memory image is divided into a number of said "pages". Memory pages may for example be 4 kilobytes or 8 kilobytes in size. Then, a processor may calculate a hash value for each memory page of the computer program/memory image using a hash function ("hashing"). The hash function may be any hash function such as for example SHA or MD5. The hash function may create an associated hash value for each memory page of a computer program or data set. The size of the output hash values may for example be 20 bytes. A processor may furthermore arrange the calculated hash values into an array or a table of hash values. Then, an array hash value for the entire hash array may be calculated using another hash function. The hash value over the hash array may for example be digitally signed with a private key using a signature function to create a digital signature over the hash array. In case that a cryptographic hash function is used, the provided hash value may already been considered as a secure signature.

According to a further exemplary embodiment, the processor is further configured to i) calculate a first hash value from a first table, ii) update the content of at least one page in the memory image, iii) increase the version number of said page in the first table, thereby providing a second table (in particular calculate a new signature over said page), and iv) calculate a second hash value from the second table using the incremental hashing operation. This may provide the advantage that updating the table and updating the hash value can be efficiently combined into one operation (see also FIG. 3 described below).

According to a further exemplary embodiment, the hash value, and/or a digital signature over the hash value, and/or a cryptographic key is/are stored in a memory of the first electronic device, in particular a secure memory, more in particular an OTP, one-time-programmable, memory. This may provide the advantage that the externally stored data set can be protected by the first electronic device in a secure and efficient manner against unauthorized use.

The first electronic device may comprise a secure memory in order to securely store a signature related to the memory image of the externally stored data. The hash value (or a plurality of hash values, e.g. a hash value calculated from the memory image and another hash value calculated from the page version table) may be calculated using a cryptographic hash function such that the hash value may be a secure hash value that already functions as a signature. Furthermore, the hash value may be digitally signed. A cryptographic key for the digitally signed hash value or the secure hash value calculated by a cryptographic hash function may also be stored in the secure memory.

According to another embodiment, the cryptographic key (or a plurality of keys) are stored in the memory (in particular the secure memory) of the first electronic device. In an embodiment, the hash value is stored in the external second electronic device and only the cryptographic key to the hash value (or the digital signature over the hash value) is stored in the first electronic device.

According to a further exemplary embodiment, a version number of the table is stored in the first electronic device (in particular in the secure memory). According to a further exemplary embodiment, the hash value (in particular the digital signature over the hash value) comprises the table version number. These embodiments may provide the advantage that also the table itself is efficiently protected by securely storing its version number.

According to a further exemplary embodiment, updating the hash value comprises using a cryptographic hash function so that the hash value is a secure hash value, in particular a signature. According to a further exemplary embodiment, the processor is further configured to calculate a digital signature over the hash value. These embodiments provide the advantage that a secure signature can be provided in an established manner.

According to an embodiment, the hashing operation is done using a cryptographic hash function. A cryptographic hash function may be a special class of a hash function that has certain properties which may make it suitable for use in cryptography. It may be a mathematical algorithm that maps data of arbitrary size to a bit string of a fixed size (a hash value) and may be designed to be a one-way function, i.e. a function which is infeasible to invert.

Cryptographic techniques have been used to verify the identities of people, software or other entities. A "digital signatures" may use a cryptographic technique to verify that a person or entity "signing" an electronic message is in fact the party that it claims to be.

According to a further exemplary embodiment, the incremental hashing operation is done using a GMC, in particular a GHASH, algorithm. In particular, the incremental hashing operation comprises two multiplication and two XOR operations. This may provide the advantage, that the incremental hashing operation can be implemented in an efficient manner using established techniques.

The Galois Counter Mode (GCM) technique may be a block cipher system that provides both confidentiality and data origin authentication. The authenticated encryption operation of GCM may receive four inputs corresponding to a secret key, an initialization vector, a plaintext, and additional authenticated data (AAD). The GCM system may provide two outputs: a ciphertext message that corresponds to the encrypted plaintext, as well as an authentication tag that may be used to verify the identity of the sender and/or to ensure the integrity of the decrypted ciphertext. GCM may be paired with the AES (advanced encryption standard) algorithm to result in AES-GCM. AES may hereby be a component of GCM, it may provide an encryption mechanism, but the data or plaintext may not be encrypted with the AES key.

GHASH may be an authentication component of GCM and belongs to a class of Wegman-Carter polynomial universal hashes that operate in the field GF ($2^{128}$). An example of a GHASH implementation of incremental hashing is described below with respect to FIG. 3.

There may be further a constant term which is an AES encryption of the initialisation vector (IV) which needs to be updated. Hereby, updating the GHASH may also require the computation of the AES initialisation vector (IV) and adding (which here may refer to adding in GF($2^{128}$), thus XORing) this back into the GHASH to achieve the incremental update. Hence, in this example, updating may also include three XOR operations.

According to a further exemplary embodiment, the first electronic device and the second electronic device are connected via a communication network. This may provide the advantage that the electronic devices are coupled in a robust and reliable manner, even over large distances. In this manner, the connection can also be designed very flexible depending on specific applications. A communication network may for example be a secure internal network.

According to a further exemplary embodiment, the first electronic device is a system-on-chip and the second electronic device is off-chip, in particular wherein the secure memory of the first electronic device is located on the chip of the processor. This may provide the advantage that the first electronic device is very robust and secure and can efficiently use an external memory.

According to a further exemplary embodiment, the memory of the second electronic device is a non-volatile EEPROM, in particular Flash-EEPROM, memory. This may provide the advantage that an established, robust, and secure technology can be directly implemented.

According to a further exemplary embodiment, updating a version number (e.g. of a page and/or of a page version table) is done using reflected binary coding. This may provide the advantage that updating can be done in an efficient manner Reflected binary coding, also known just as reflected binary or Gray coding, may be an ordering of the binary numeral system such that two successive values differ in only one bit (binary digit).

For example, when a binary code changes from 15 decimal to 16 decimal then 5 bits have to change, whereas a Gray coding of these numbers would only change one bit. Correspondingly, if there would be e.g. 8-bit codes representing numbers from 0 to 255, then each code would occupy the same space but the number of bits changing with a transition from n to n+1 would always be one in the Gray code case. In a binary code, however, all 8 bits may change in the worst case (when n=127 and n+1=128).

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

The illustrations in the drawings are schematic. In different drawings, similar or identical elements are provided with the same reference signs.

DESCRIPTION OF EMBODIMENTS

Before, referring to the drawings, exemplary embodiments will be described in further detail, some basic considerations will be summarized based on which exemplary embodiments of the invention have been developed.

According to an exemplary embodiment of the invention, it would be beneficial to have a mechanism to allow an "update" of a (externally stored) subset of data, to be reflected by an update to a signature over the subset of data that requires an amount of work proportional to the amount of data updated, rather than proportional to the total amount of data covered by the signature. Using an incremental hashing operation provides this capability. Also with respect to hash trees, a time saving can be achieved by using an incremental hashing scheme, in particular if the hierarchy of the tree was chosen to be very shallow.

According to an exemplary embodiment of the invention, a final optimization to allow validation of data at "page level" (in a paging system), is to provide each page with its own version and signature. The security module (a first electronic device) then needs to maintain a table of page versions (rather than a hash tree) and stores the signature (e.g. a secure hash value or a digital signature over a hash value) over this table of versions in a secure memory. The amount of secure memory used can be further optimized by also providing the root signature with a version (included in the signature) and storing this "root signature version" in a secure on-chip memory (e.g. a secure memory of the first electronic device).

According to an exemplary embodiment of the invention, a key feature is leveraging the incremental hashing capability provided by the GMAC algorithm (part of the AES-GCM algorithm) to allow fast and update of the root hash protecting the complete externally stored data memory image.

According to an exemplary embodiment of the invention, in a first place, the complete data image is subdivided into pages of a given size, wherein every page is given its own version and signature. Then, when the contents of a single page change, its version is increased and a new signature over the page is calculated (stored with the page). The version entry for the changed page in the page version table is incremented, and the version number of the page version table itself is incremented. As a result, the signature (secure "PVT hash value") over the page version table, needs to be updated. Since only one or more entries in the table have changed, this update can be done incrementally.

According to an exemplary embodiment of the invention, the fact that GHASH is linear in the data input (when one excludes the extra AES blinding factor) allows the incremental updating of the GHASH of a PVT to work efficiently. In this respect, GHASH is not like a conventional cryptographic hash function like SHA or MD-5. The latter are markedly non-linear and if one changes a single input bit, one has to recompute the entire hash value due to their non-linear diffusion properties. GHASH is a polynomial in a secret H whose coefficients are the message data being "GHASHed". This linearity in the coefficients is a specific advantage. Each GHASH computation has a new secret blinding constant term which is an AES encryption of the IV (initialization vector), without which an attacker could possibly figure out H.

According to an exemplary embodiment of the invention, the incremental hashing operation can be done using the GHASH algorithm. The GHASH algorithm is defined as follows (using a simple message "a, b, c, d, e, f . . . " as an example): GHASH ("a, b, c, d, e, f . . . ")=$a*H^6+b*H^5+c*H^4+d*H^3+e*H^2+f*H$. Hereby, a to f represent 128-bit blocks (in common with the block sizes used in AES and the GHASH specification). XOR operation and multiplication ($a*H^6$, $b*H^5$ . . . etc.), defined over a Galois field, can, in digital hardware, be implemented very efficiently and performant. Because of this structure, it is relatively easy to replace an individual term, e.g. "c", by another term, e.g. "q" as follows:

i) calculate the power of H corresponding to the location of the updated term, in the sequence. In case of the example "c", the value of $H^4$ is required.

ii) multiply this power of H with the old value ("c") to receive the value of the relevant component in the XOR chain ($c*H^4$), and XOR this value with the original signature. This effectively removes the original term $c*H^4$, from the XOR sum.

iii) multiply the same power of H with the new (updated) value ("q") to receive the new component value that is then added to the XOR chain ($q*H^4$).

iv) XOR the new component value with the result of step ii), effectively adding back-in the updated component in the XOR sum, to get the updated signature.

Furthermore, there is a constant term which is an AES encryption of the initialisation vector (IV) which needs to be updated. Hereby, updating the GHASH also requires the computation of AES (old_IV)<+>AES (new_IV) and adding (which here means adding in $GF(2^{128})$, thus XORing) this back into the GHASH to achieve the incremental update (step v).

According to an exemplary embodiment of the invention, there is provided a combination of the page-based authentication and a page-based freshness check. The incremental hashing operation is used to update the signature over a page version table to make this freshness check possible in a storage and computationally effective way. Systems based on hash trees do not require the page version table, but they do require the caching and/or recalculation of intermediate hash values, and typically multiple hash operations, to propagate the update of a single page, through the tree, into the root hash. Systems based on hash trees also do not suffer from the implementation challenge that one cannot generate the same page number with different content but the same version, twice, as that would break the security of the system.

According to an exemplary embodiment of the invention, the described system is for use in the realization of secure processing modules requiring access to and/or use of a secure non-volatile storage, in technologies where such non-volatile storage is not available on-chip. In particular, to enable the design of the "Integrated Secure Element Family" (ISEF) that aims to integrate secure element-like functionality and security, into application processors (like i.MX), implemented in deep sub-micron technologies in which no other on-chip non-volatile storage than OTP is available. The system intents to provide a solution to the challenge of protecting data that is externally stored (i.e. outside of the SoC) from unauthorized modification, replacement, or replay—typically introducing a significant overhead in terms of computation, access latency, and on-chip storage of intermediate values.

According to an exemplary embodiment of the invention, the ISEF NVM emulation system requires the ability to store pages outside of the ISEF physical security boundary. During operation, ISEF may need to update the content of the page, causing it to write different versions of the same page to external NVM. On read-back, ISEF must be able to determine the freshness of the page as it imported back into the security domain 'freshness' means that the version of the page that is received, is indeed the version of that page, expected by ISEF. To validate freshness of a page, ISEF must be able to compare the version of the received page against an internally stored (immutable) value. This value must be capable of surviving power cycles. There are potentially many pages frequently updated—but only a limited amount of OTP collection of stored page versions, referred to as "Page Version Table" (PVT). The PVT must be capable of surviving power cycles—but cannot be stored in the OTP. Therefore, the PVT itself needs to be persisted in external Flash, thus, the PVT has to have its own version number. The PVT version implemented using a "Trusted Monotonic Counter" (TMC) implemented in ISEF-controlled OTP/fuses to survive power cycles.

Figure 1:
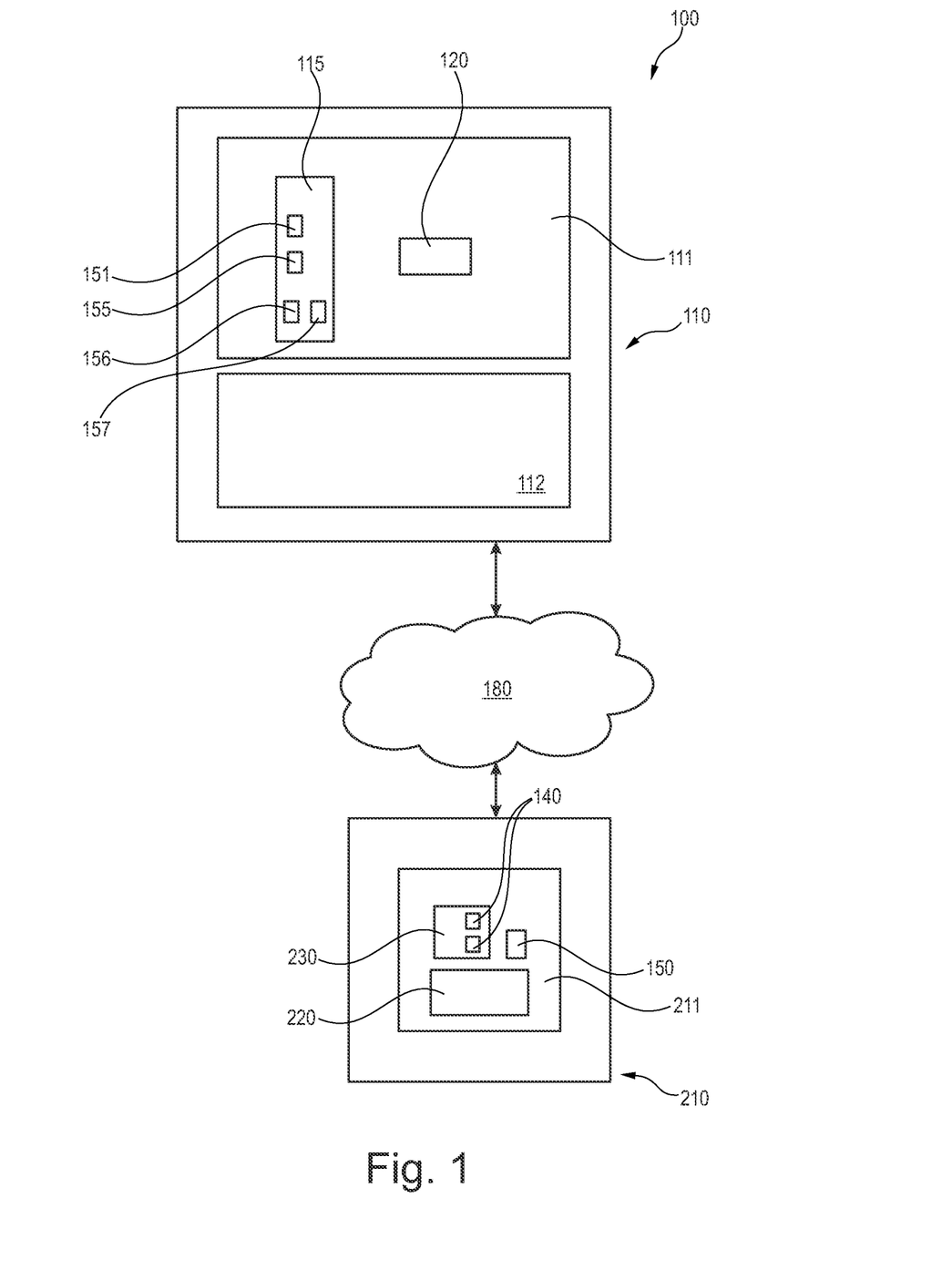
FIG. 1 illustrates an exemplary embodiment of a memory system according to the invention.

FIG. 1 illustrates a memory system 100, comprising a first electronic device 110 and a second electronic device 210 being external of the first electronic device 110. The first electronic device 110 is configured as an on-chip secure subsystem and comprises a processor 112 and a memory 111. In the memory 111, an optional first data set 120 is stored. The first electronic device 110 further comprises a secure memory 115. The second electronic device 210 comprises a memory 211, wherein the memory 211 is a non-volatile Flash-EEPROM memory. The memory 211 of the second electronic device 210 stores a data set 220 and a memory image 230 over at least a part of the data set 220 stored on the memory 211. The memory image 230 is divided into pages 140, wherein each page 140 has its own version number 141 and signature. Furthermore, the second memory 211 stores a table 150 which is a page version table 150 being indicative for information and versions of the pages 140 of the memory image 230. The memory system 100 comprises further a hash value 155 related to the memory image 230 and is stored in the secure memory 115 of the first electronic device 110.

The first electronic device 110 and the second electronic device 210 are coupled over a communication network 180. Hereby, the processor 112 has at least partial control over the second electronic device 210, especially over the second memory 211. The processor 112 is configured to, when updating the data set 220 stored on the memory 211 of the second electronic device 210, update the hash value 155 related to the memory image 230 using an incremental hashing operation so that only those parts 140 of the memory image 230 are processed that have changed. The first electronic device 110 stores in the secure memory 115, which comprises an OTP memory or fuses, further the hash value 155 related to the memory image 230, in particular the hash value 155 over the page version table 150. The first electronic device 110 also stores the version number 151 of the page version table 150. Furthermore, the first electronic device 110 stores a digital signature 156 calculated over the hash value 155 and/or a cryptographic key 157 for the digital signature 156 and/or the hash value 155. The processor 112 is further configured to, when updating the data set 220 and the memory image 230, also update the hash value 155 over the page version table 150, in particular also the digital signature 156, using the incremental hashing operation, so that only those pages 141 of the page version table 150 are processed that have actually changed.

Figure 2:
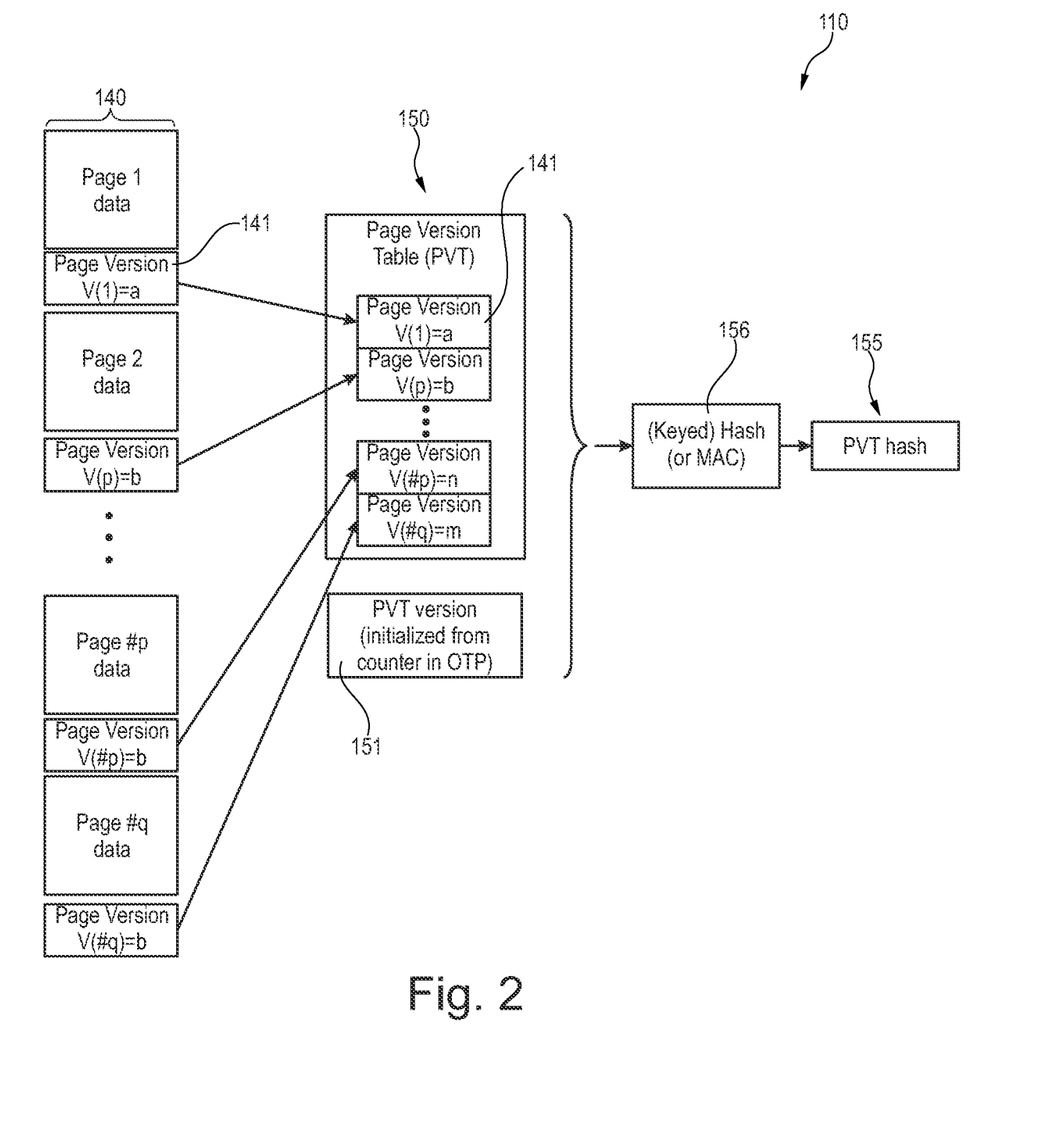
FIG. 2 illustrates an exemplary embodiment of a page version table and a hash over the page version table according to the invention.

FIG. 2 illustrates a page version table 150 and a hash value 155 over the page version table 150 according to an embodiment of the invention. The memory image 230 is subdivided into a plurality of pages 140, wherein each page 140 comprises its own version number 141 and signature (not shown). The page versions 141 (and optionally also the signatures) are combined into the page version table 150. The page version table 150 also comprises a version number 151 which can be securely stored in the first electronic device 110. Using a cryptographic hash operation (or a MAC operation), a hash value 155 of the page version table 150 can be obtained. In a further step, the hash value 155 over the table 150 can be digitally signed in order to obtain a digital signature 156. The hash value 155 and the signature 156 can be securely stored in the first electronic device 110.

Figure 3:
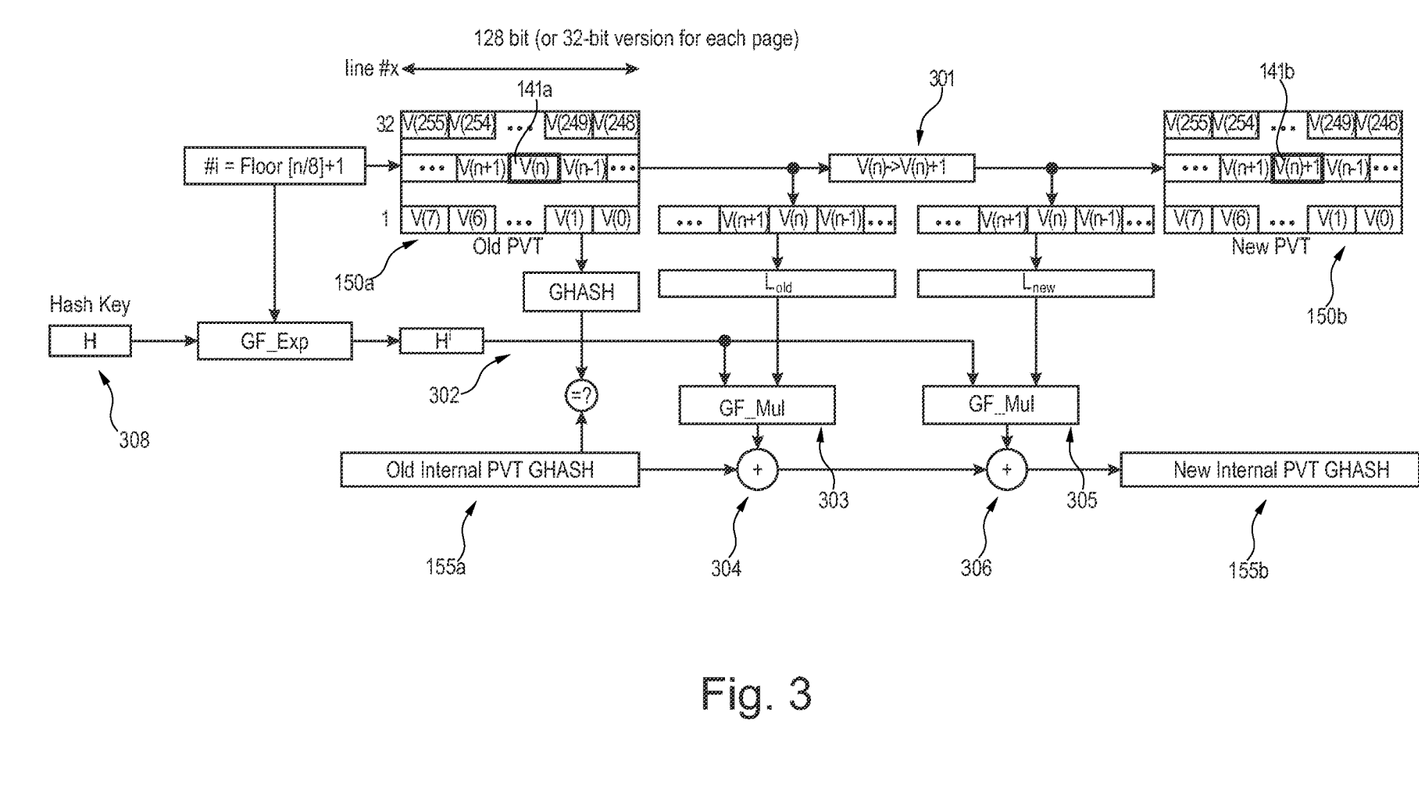
FIG. 3 illustrates an exemplary embodiment of a method of updating a page version table using an incremental hashing operation according to the invention.

FIG. 3 illustrates a method of updating/processing the page version table 150 using the incremental hashing operation. In a first page version table 150a, which is the old version, the version number 141a of one specific page 140 is updated in step 301 from V(n) to V(n)+1 in order to obtain a second page version table 150b, which is the new version, that comprises the updated version number 141b. Hereby, also a first hash value 155a of the first page version table 150a has to be updated to a second hash value 155b. This is done with an incremental hashing operation implemented using the GASH algorithm as described in the following.

A hash value key H is provided (e.g. using the AES algorithm) in step 308 and the power of H, corresponding to the location of the updated term, is calculated. Said power of H is then multiplied in step 303 with the old table value Lola to receive a first multiplication value. Said first multiplication value is XORed in a first XOR operation 304 with the first hash value 155a. Furthermore, the power of H is multiplied in step 305 with the new updated table value $L_{new}$ to receive a second multiplication value. This second multiplication value is then XORed with the first multiplication value in a second XOR operation 306. The result is the new updated second hash value 155b. In summary, when updating the page version table 230 stored on the memory 211 of the second electronic device 210, the hash value 155 related to the memory image 230, in particular the hash value 155 over the page version table 150, is updated using the incremental hashing operation so that only those parts 140 of the memory image 230, in particular those parts of the page version table 150, are processed that have changed.

Figure 4:
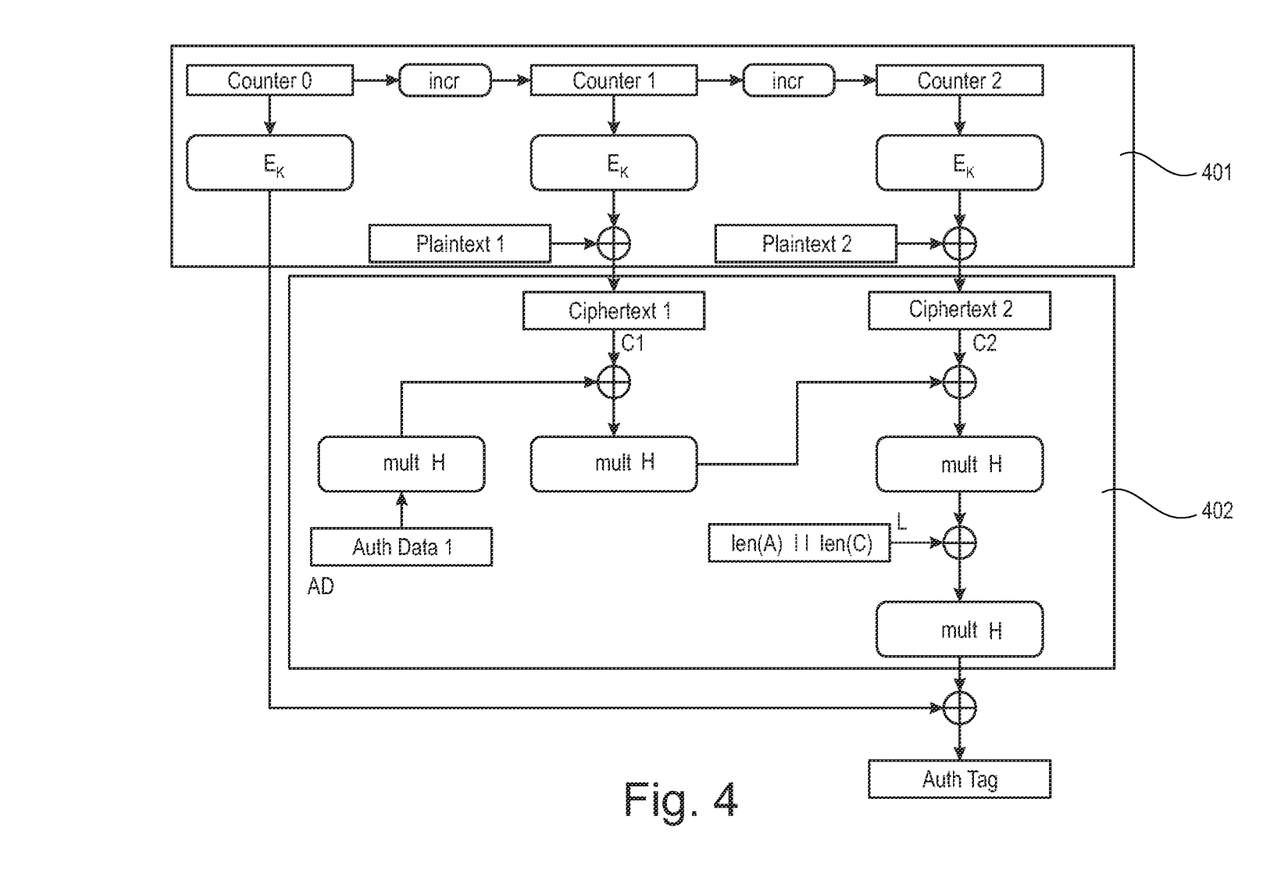
FIG. 4 illustrates an exemplary embodiment of the GCM algorithm including GHASH as it may be used in a method of operating a memory system using an incremental hashing operation according to the invention.

FIG. 4 illustrates an exemplary embodiment of the GCM algorithm with a counter mode encryption part 401 and a GHASH part 402. A counter (value) is encrypted and XORed with the plaintext to give the ciphertext. Then, the GHASH 402 is computed over the concatenation of additional authenticated data and the ciphertext. All parts of a message are touched by H, wherein H is a secret= E[K, 0x00 . . . ] (="blind"). Additionally, "blind" is used to ensure that one cannot get H from message differentials. It must be different for every version, which happens automatically when "counter 0" changes. Multiplication by H is done in $GF(2^{128})$ mod $p(x)$, wherein $p(x)=x^{128}+x^7+x^2+x+1$. The authentication tag may hence be described as: $AD*H^4+C1*H^3+C2*H^2+L*H+E[K, CTR0]$, wherein the block E[K, CTR0] is "blind".

REFERENCE NUMERALS

100 Memory system
110 First electronic device
111 Memory of first electronic device
112 Processor
115 Secure memory/OTP memory
120 Data set of first electronic device
140 Page
141 Page version number
141a First version number (old)
141b Second version number (new)
150 Table/page version table
150a First table (old)
150b Second table (new)
151 Table version number
155 Hash value
155a First hash value (old)
155b Second hash value (new)
156 Digital signature over hash value
157 Cryptographic key
180 Communication network
210 Second electronic device
211 Memory of second electronic device
220 Data set of second electronic device
230 Memory image
301 Update of page version number
303, 305 Multiplication operation
304, 306 XOR operation
308 Hash key provision
401 Counter mode encryption
402 GASH

The invention claimed is:

1. A memory system, comprising:
a first electronic device comprising a processor and a secure memory, the first electronic device is a system-on-chip;
a second electronic device being external to the first electronic device and comprising a memory, wherein the memory stores a memory image over at least a part of a data set stored on the memory and stores a table being indicative of information or versions, or both, of the parts of the memory image; and
a hash value related to the memory image stored in the secure memory of the first electronic device, wherein the hash value is calculated from the table;
wherein the first electronic device and the second electronic device are coupled such that the processor has at least partial control over the second electronic device; and
wherein the processor is configured to, when updating the data set and the table stored on the memory of the second electronic device, update the hash value in the secure memory wherein the updated hash value is calculated from the updated table using an incremental hashing operation so that only those parts of the table are processed that have changed,
wherein the memory image is divided into a plurality of pages, and the processor is further configured to:
calculate a first hash value from a first table, the first table indicating a version number for each page of the memory image;
store the first hash value in the secure memory;
update the content of at least one page of the memory image;
increase the version number of said page in the first table, thereby providing a second table corresponding to an updated version of the first table;
calculate a second hash value from the second table using the incremental hashing operation; and
update the first hash value to the second hash value.

2. The memory system according to claim 1,
wherein the memory image is divided into a plurality of pages; and
wherein the table is a page version table that comprises the version number, in particular also a signature, of each page; and
wherein the processor is further configured to, when the contents of a page change, increment the version number for said page in the page version table.

3. The memory system according to claim 1,
wherein the hash value, or a digital signature over the hash value, or a cryptographic key, or combinations thereof, are stored in a memory of the first electronic device, in particular the secure memory, more in particular an OTP, one-time-programmable, memory.

4. The memory system according to claim 3,
wherein a version number of the table is stored in the first electronic device, in particular in the secure memory; or
wherein the hash value, in particular the digital signature over the hash value, comprises the table version number.

5. The memory system according to claim 1,
wherein updating the hash value comprises using a cryptographic hashing function so that the hash value is a secure hash value, in particular a signature; and/or
wherein the processor is further configured to calculate the digital signature over the hash value.

6. The memory system according to claim 1,
wherein the incremental hashing operation is done using a GMC, in particular a GHASH, algorithm.

7. The memory system according to claim 1,
wherein the incremental hashing operation comprises two multiplication and two XOR operations.

8. The memory system according to claim 1,
wherein the first electronic device and the second electronic device are connected via a communication network.

9. The memory system according to claim 1,
wherein the second electronic device is off-chip, in particular wherein the secure memory of the first electronic device is located on the chip of the processor.

10. The memory system according to claim 1,
wherein the memory of the second electronic device is a non-volatile EEPROM, in particular a Flash-EEPROM, memory.

11. The memory system according to claim 1,
wherein updating the version number is done using reflected binary coding.

12. A method of operating a memory system having a first electronic device, the first electronic device being a system-on-chip, a second electronic device being external to the first electronic device, the second electronic device comprising a memory, wherein the memory stores a memory image over at least a part of a data set stored on the memory and stores a table being indicative for information or versions, or both, of the parts of the memory image, and a hash value related to the memory image, calculated from the table, and stored in a secure memory of the first electronic device, the method comprising:

coupling the first electronic device and the second electronic device such that the first electronic device has at least partial control over the second electronic device;

updating the data set and the table stored on the memory of the second electronic device; and updating the hash value related to the memory image, calculated from the updated table, using an incremental hashing operation so that only those parts of the table are processed that have changed, wherein the memory image is divided into a plurality of pages, and the memory further comprises:

calculating a first hash value from a first table, the first table indicating a version number for each page of the memory image;

storing the first hash value in the secure memory;

updating the content of at least one page of the memory image;

increasing the version number of said page in the first table, thereby providing a second table corresponding to an updated version of the first table;

calculating a second hash value from the second table using the incremental hashing operation; and updating the first hash value to the second hash value.

13. The method according to claim 12,
wherein the secure memory of the first electronic device is located on the chip of the processor.

* * * * *